(No Model.)  2 Sheets—Sheet 1.
H. C. PRATT.
CULTIVATOR.
No. 340,894. Patented Apr. 27, 1886.
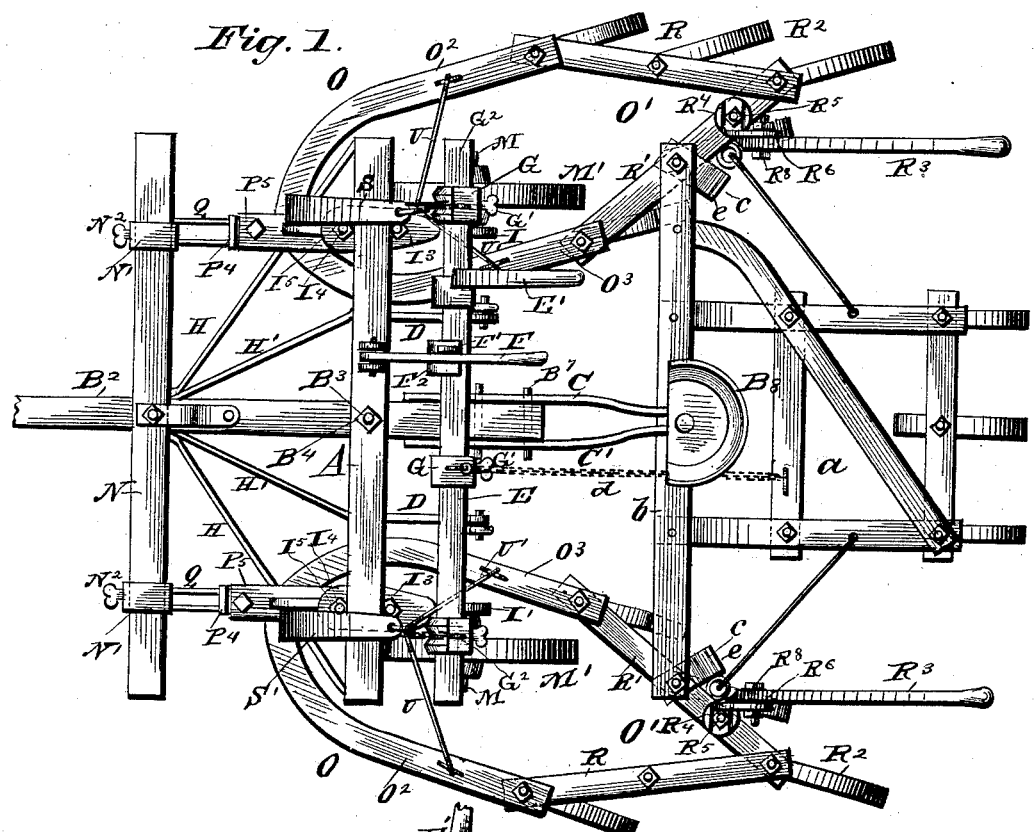
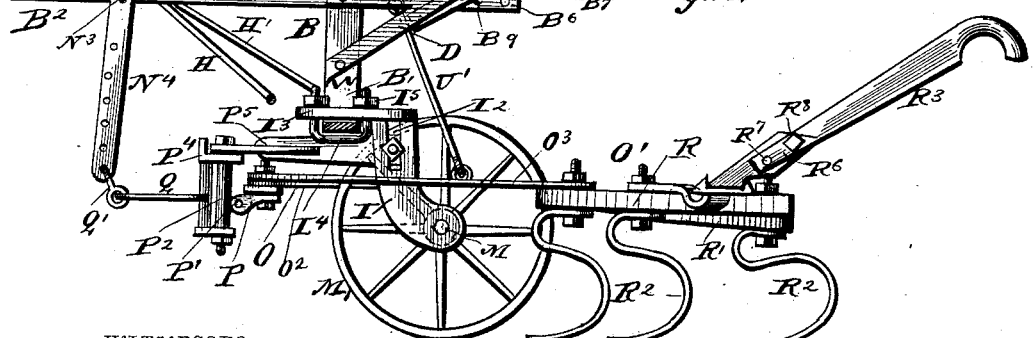
WITNESSES
Phil C. Masi.
Grace M. Craig
INVENTOR
Henry C. Pratt
By Anderson & Smith
his
Attorneys (No Model.) 2 Sheets—Sheet 2.
H. C. PRATT.
CULTIVATOR.
No. 340,894. Patented Apr. 27, 1886.
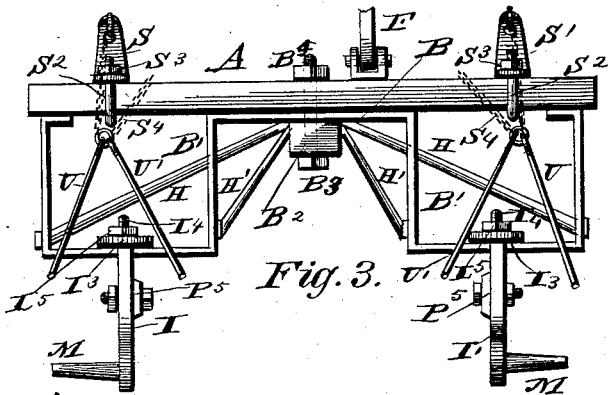
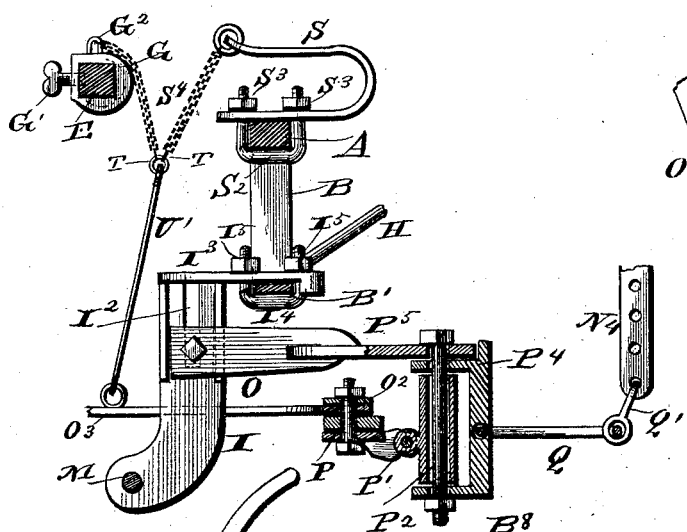
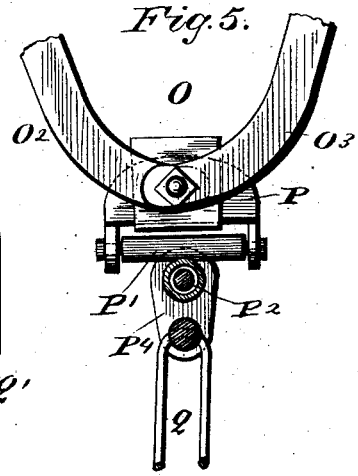
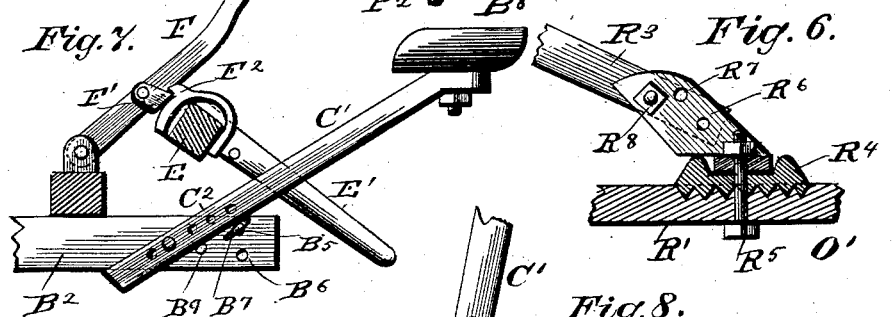
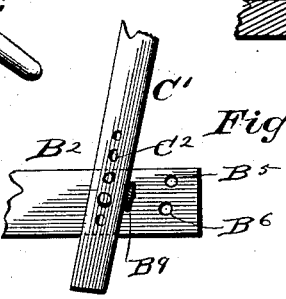
WITNESSES
Phill Musi
Grace M. Craig
INVENTOR
Henry C. Pratt
by Anderson & Smith
his Attorneys

UNITED STATES PATENT OFFICE.

HENRY C. PRATT, OF CANANDAIGUA, NEW YORK.

CULTIVATOR.

SPECIFICATION forming part of Letters Patent No. 340,894, dated April 27, 1886.

Application filed February 20, 1886. Serial No. 192,093. (No model.)

*To all whom it may concern:*

Be it known that I, HENRY C. PRATT, a citizen of the United States, residing at Canandaigua, in the county of Ontario and State of New York, have invented certain new and useful Improvements in Cultivators; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a plan view, with the auxiliary harrow attached. Fig. 2 is a vertical section of the same with the auxiliary harrow removed. Fig. 3 is a rear elevation showing the construction of the stirrups. Fig. 4 is an enlarged sectional detail, and Figs. 5, 6, 7, and 8 are detail views.

This invention relates to combined corn and fallow cultivators for cultivating both corn and fallow ground; and it consists in the construction and novel combination of parts, as will be hereinafter fully described, and pointed out in the claims.

Referring by letter to the accompanying drawings, A designates the main cross-beam of the cultivator-frame, to the under side of which the metallic double stirrup-frame B is securely bolted, the stirrups B' of said stirrup-frame being near the ends of the main cross-beam.

The tongue $B^2$ of the cultivator is secured in place beneath the main cross-beam by a bolt, $B^3$, passed up through the tongue, through the connecting-arm of the stirrup-frame, and through the main cross-beam A, which bolt $B^3$ is held in place by a nut, $B^4$. The tongue $B^2$ extends back a short distance beyond the main cross-beam, and to its sides, near its rear end, are pivoted the two extension-arms C C', which support the seat. The rear end of the tongue $B^2$ is provided with lateral holes $B^5 B^6$—one above the other—and the extension-arms C C' are provided with holes $C^2$, which may be brought into alignment with either one of these holes $B^5 B^6$, and a pin or bolt, $B^7$, may be and is inserted into the aligned holes to hold the seat $B^8$ at the desired elevation. A hole, $B^9$, is also provided in front of holes $B^5 B^6$, in which the pin is inserted to hold the seat up out of the way when the machine is used as a walking-cultivator.

From the inner vertical arms of the stirrup-frame B, brackets D D extend rearwardly, and to the upper ends of these brackets D D is hinged a transverse rock shaft, E, which is provided with a hand-lever, E', by which to operate it. A second hand-lever, F, is fulcrumed in bearings upon the main cross-beam A, and extends rearwardly over the transverse rock-shaft E. This hand-lever F is provided with a pivoted pawl, F', which is adapted to engage a detent, $F^2$, secured to the forward side of the transverse rock-shaft E, near the hand-lever F, and hold the cultivator-sections up when said hand-lever has been properly depressed for that purpose. The pivoted pawl F' is for the purpose of disengaging the projection on the lever F and the detent $F^2$ without the operator having to take hold of the second lever. The pawl pivoted to the end of the lever drops in front of the detent $F^2$ when the hand-lever E' has been sufficiently depressed, and prevents the lever from engaging the detent $F^2$ when the operator lets go of his lever to lower the cultivators, the object being to raise and lower the rock-shaft E without having to touch the lever E'. The transverse roll-bar E is provided with castings G—three in number, one for each cultivator-section—which are slipped upon the rock-shaft, which is rectangular in cross-section, and are held in place by thumb-screws G', to permit lateral adjustment of said castings on the roll-bar when desired, and to hold the castings to their adjustments after the latter have been made. The stirrup-frame is connected near the lower ends of both its outer and inner vertical arms by brace-rods H H' to the tongue $B^2$ in front of the main cross-beam A, said brace-rods H H' being securely bolted to the sides of the tongue and to the vertical arms of the stirrup-frame. Vertical standards I I', having vertical longitudinal slots $I^2$ in their upper portions, are provided at their upper ends with horizontal arms $I^3$, which arms $I^3$ are rigidly connected to the lower horizontal portions of the stirrup-frame B by clips $I^4$, held in place by nuts $I^5$. The journals M for the wheels M' are formed integrally with the standards I I', and extend outwardly near the lower ends of said standards, which latter are preferably curved rearwardly near their lower ends. The vertical standards I I' are rigidly connected with the stirrup-frame, but are adjustable on it, so as to permit the cultivators to be placed close together or wide apart. When the auxiliary section is to be used, the cultivators proper are placed as far apart as the standards on the stirrup-frame can go. When placed to the outside limit, the cultivators will be four feet apart from center to center—a width adapted to the widest distance to which corn is planted. If the rows to be cultivated were three feet apart, the standards would be placed midway between the vertical arms of the stirrup-frame. While the crop is small it may sometimes be desirable to cultivate but one row at a time. When this is to be done, the cultivators are placed close together by moving the standards on the stirrup-frame to the inside vertical arms of said frame. When two rows at a time are to be cultivated, which will usually be the case, the evener-bar is adjusted to bring the horses into the middle of each space. The standards I I' are also adjusted and the springs on the main cross-beam, and the hooks for the chains on the rock-shaft. The vertical standards I I' are curved rearwardly at the bottom, so as to bring sufficient weight forward of the wheels to properly balance the machine.

The evener-bar N is secured upon the cultivator-tongue B² by a king-bolt in the usual manner, and is provided with adjustable castings N', which are slipped thereon and held to their adjustments by thumb-screws N². These castings N' are provided on their lower sides with hooks N³, from which perforated arms N⁴ depend. The front part, O, of each of the two main cultivator-frames O' is composed of two curved metal bars, O² O³, which are pivoted at their forward ends one upon the other and also to a casting, P, journaled on a cross-arm, P', of the vertical pivot-rod P². The rod P² has its upper and lower bearings in a bracket or casting, P⁴, and the slotted vertical standards I I' are connected to the upper ends of the castings P⁴ by horizontal arms or beams P⁵. The brackets P⁴ are connected by links Q, having linked hooks Q' at the forward ends, to the depending perforated arms N⁴. The rear part of each of the two main cultivator-frames is composed of two wooden bars, R R', which are pivoted to the rear ends of the arms of the front part, O, by bolts and nuts, and these bars R' are provided with the cultivator-teeth R² and the handles R³, by which to guide and control the cultivator-sections. The handles R³ are connected to the inner wooden bars, R', of the cultivator-frames by flanged castings R⁴, secured in place by bolts R⁵. The flanged castings R⁴ are made with a corrugated surface that comes next to the wood to prevent them from slipping. The handles may be adjusted laterally as well as vertically to suit the person operating the machine. These handles R³ are pivoted to the upwardly-extending arms R⁶, which are provided with two or more perforations, R⁷, for the bolt R⁸, which is passed through a hole near the lower end of each handle into either one of the perforations or bolt-holes R⁷, as may be desired, thus providing for the adjustment of the handles to suit persons of different heights. Curved springs S S' are secured to the upper face of the main cross-bar, near each end of the same, by staple-bolts S² and nuts S³, and to the upper rear ends of these springs S S' chains S⁴ are connected by hooks T, and the rear ends of these chains S⁴ are connected to the hooks G² of the castings G on the roll-bar E. Intermediate of the main cross-beam A and the rock-shaft E the chains S⁴ are connected by hinge-rods U U' to the front parts, O, of the cultivator-frame, so that when the rock-shaft E is raised by bearing down upon its lever F the harrow-frames will be raised from the ground through the media of the springs, chains, and hinge-rods.

a designates the auxiliary cultivator-section, which is to be connected to the two main cultivor-sections when it is desired to use the cultivator in harrowing fallow ground. This section a is provided with harrow-teeth or cultivator-teeth similar to the teeth of the other sections, and is connected to the inner wooden bars of the two main sections by a transverse front bar, b, which is bolted to short curved metallic arms c c on the said wooden bars. The transverse bar b keeps the cultivator-sections spread out, so that the teeth will properly cover the ground to be harrowed. This auxiliary cultivator-section is connected with the intermediate casting, G, on the roll-bar E by a chain, d, so that it will be raised from the ground, when in use, at the same time the main cultivator-sections are raised. When the auxiliary cultivator-frame is not in use, the two main cultivators are held apart by the driver's feet, which rest in stirrups e e, secured to the rear wooden bars of the cultivator-frames. The iron bars that form the forward parts of the cultivator-frame are connected with the wooden bars that form the rear portions of said frames by castings that are flanged on top to receive the iron bars and corrugated on their under surfaces where they come in contact with the wooden bars. This connection makes the joints rigid when the bolts have been tightened. The auxiliary harrow-section is connected by the transverse bar b, which is bolted at each end to the bar R'. Rearwardly it is connected with the other sections by linked bolts entering the inner wooden bars, R'. The cultivators do not necessarily have to be held apart by the feet of the operator, but will draw rearwardly of any point on the stirrup-frame to which the standards I I' may be adjusted.

The advantages of this construction over the frame patented to me December 4, 1883, are considerable. The advantage in having the rail-pieces not extend rearwardly of the point where they intersect, and having the teeth that were formerly attached to the rearward projections of the frame now placed on the bars between the rear and forward teeth midway, is, that less surface is presented to the ground by the teeth lengthwise of the cultivators than before. This improvement permits the cultivators to better accommodate themselves to any unevenness of the surface over which they are being drawn. The arms $P^5$ and standards I I' have corrugated surfaces where they come together. A thin block of wood is placed between the metallic bars $O^2$ $O^3$ and the casting P, to prevent slipping.

Having described this invention, what I claim, and desire to secure by Letters Patent, is—

1. The combination, with the main cross-beam, the stirrup-frame, and tongue connected by the brace-rods and a bolt to the cross-beam and stirrup-frame, of the evener-bar provided with the castings N', having hooks $N^3$, the perforated arms $N^4$, the main cultivator-frames O, the castings P, journaled on the rods $P^2$, having bearings in the bracket $P^4$, the horizontal beams $P^5$, and slotted standards and riding-wheels, substantially as specified.

2. The combination, with the cultivator-frame having the stirrup-frame, the tongue, and evener-bar, of the main cultivator-sections connected to the evener-bar by the perforated arms $N^4$ and links Q, with hooks Q', the hinged roll-bar with the hand-lever and detent-lever, the springs S S', the chains $S^4$, hinge-rods U U', connecting the chains $S^4$ and front parts of the cultivator-frames, the horizontal beams $P^5$, with swivel-castings at their forward ends, the slotted standards, and riding-wheels, substantially as specified.

3. The combination, with the cultivator-frame, the tongue, and evener-bar, of the main cultivator-sections connected at their forward ends by link and swivel connections to the evener-bar, the roll-bar having the hand-lever and detent-lever, the springs S S' on the main cross-beam, the link-rods and chains $S^4$, and the slotted standards and riding-wheels connected by the horizontal beams to the swivels, substantially as specified.

4. The combination, with the wooden bar R' of the cultivator-frames, of the flanged casting $R^4$ and the handle $R^5$, pivoted to the arm $R^6$ of said casting $R^4$, and held by the bolt $R^3$, substantially as specified.

In testimony whereof I affix my signature in presence of two witnesses.

HENRY C. PRATT.

Witnesses:
FRED. W. BRYAN,
MICHAEL D. DUGAN.